United States Patent [19]
DiSaverio

[11] Patent Number: 5,767,768
[45] Date of Patent: Jun. 16, 1998

[54] BRAKE PAD WEAR DETECTION AND WARNING SYSTEM

[76] Inventor: Claudio DiSaverio, 2322 Shipley Rd., Wilmington, Del. 19803

[21] Appl. No.: 618,024

[22] Filed: Mar. 25, 1996

Related U.S. Application Data

[60] Provisional application No. 60/006,898 Nov. 20, 1995.

[51] Int. Cl.⁶ .................................................. B60Q 1/00
[52] U.S. Cl. .................. 340/454; 73/132; 188/1.11 R; 200/61.4
[58] Field of Search ............. 340/454; 188/1.11 R; 73/121, 132; 116/208; 200/61.4

[56] References Cited

U.S. PATENT DOCUMENTS

| | | | |
|---|---|---|---|
| 3,605,085 | 9/1971 | Fiorita | 340/454 |
| 4,013,143 | 3/1977 | Juhasz | 340/454 |
| 4,658,936 | 4/1987 | Moseley | 188/1.11 |
| 5,347,858 | 9/1994 | Ito et al. | 340/454 |

*Primary Examiner*—Jeffery Hofsass
*Assistant Examiner*—Daniel J. Wu

[57] ABSTRACT

A resiliently biased plunger extends through a hole completely through the brake shoe and into a hole partially into the brake pad. The hole in the brake pad is of a depth that leaves the desired brake pad wear intact. When the brake pad is worn to the desired depth the plunger is resiliently urged through the brake pad to complete an electrical circuit which in turn gives a warning signal.

3 Claims, 1 Drawing Sheet

BRAKE PAD WEAR DETECTION AND WARNING SYSTEM

CROSS-REFERENCE TO RELATED APPLICATION

This application is based on Provisional Application 60,006,898, filed Nov. 20, 1995.

BACKGROUND OF THE INVENTION

It is desirable to provide some detection and warning system to indicate to the operator of a vehicle when there has been undue wear of a brake pad. Such system should advantageously be adaptable to existing automotive assemblies without requiring complicated and drastic redesigns of the assembly.

U.S. Pat. Nos. 3,271,737 and 3,716,832 disclose approaches taken in the prior art to provide indication of brake wear.

SUMMARY OF THE INVENTION

An object of this invention is to provide a brake pad wear detection and warning system which detects and warns the operator of a vehicle of wear of the brake pad beyond the desired depth.

A further object of this invention is to provide such a system which permits continuous indication of worn brakes without interference with normal braking operations reaching the predetermined amount of brake wear.

In accordance with this invention a resiliently biased plunger is slidably mounted in a hole extending completely through the brake shoe and then into an aligned hole in the brake pad. The depth of the hole in the brake pad corresponds to the desired amount of brake pad wear that should be intact. When the brake pad is worn to the predetermined depth the plunger is urged through the brake pad to form an electrical circuit giving off a warning.

THE DRAWINGS

DETAILED DESCRIPTION

The present invention relates to environments using a brake pad. Typically brake pads are used, for example, in vehicles where a brake pad is mounted on a brake shoe at a fixed distance from the rotating brake drum or disc. As used herein the terms "drum" and "disc" are used interchangeably. When the brake is actuated the brake pad engages the brake drum to prevent the brake drum from rotating.

Figure 1:
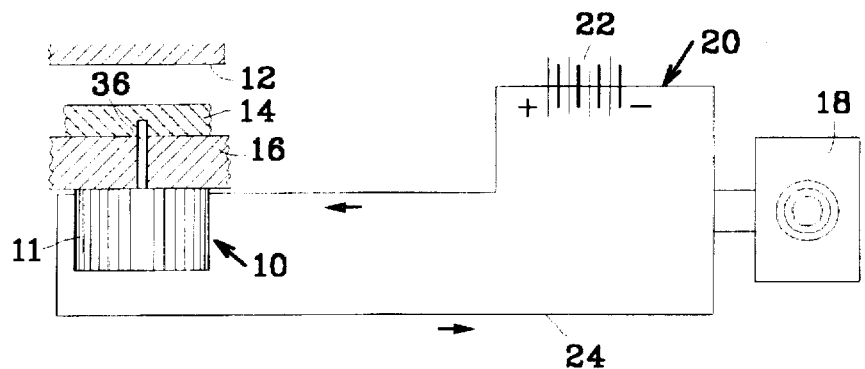
FIG. 1 is a schematic view in cross section illustrating various components of the brake pad wear detection and warning system of this invention.

FIG. 1 illustrates the various components in the system of this invention. As shown therein the system 10 is illustrated as being in an environment which includes a brake drum 12 rotatably mounted and selectively engaged by a brake pad 14 mounted to the outer surface of brake shoe 16 when the brake is applied. Thus, when brake pad 14 contacts brake drum 12 rotation of the brake drum 12 is halted. In accordance with this invention the system 10 indicates when a predetermined amount of wear of brake pad 14 has occurred to give an indication by indicator 18 upon the completion of an electrical circuit 20. Electrical circuit 20 could be of any suitable construction for accomplishing the objects of this invention. As illustrated in FIG. 1 electrical circuit 20 includes a power source 22 with the necessary electrical wiring 24. The indicator 18 is illustrated as being a warning light. Alternatively or in addition the indicator could also give an audio alarm.

Figure 2:
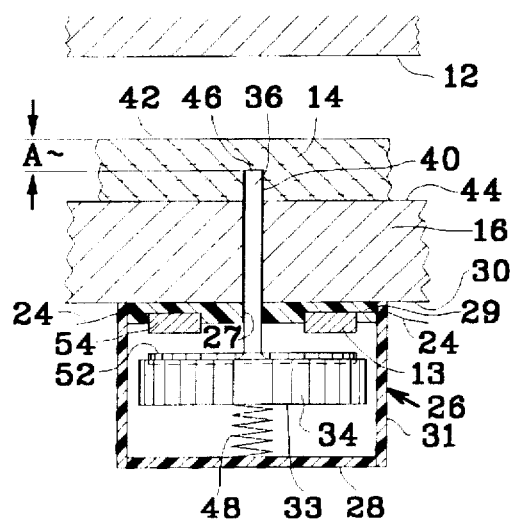
FIG. 2 is an enlarged cross-sectional view showing the components of the system shown in FIG. 1 in a condition where there is still sufficient brake pad remaining.
Figure 3:
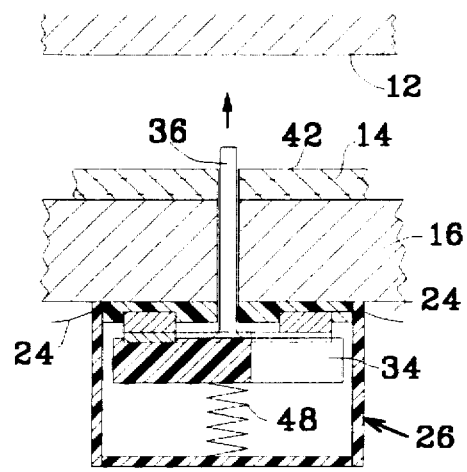
FIG. 3 is a view similar to FIG. 2 showing the condition of the components when there has been a predetermined amount of wear in the brake pad.
Figure 4:
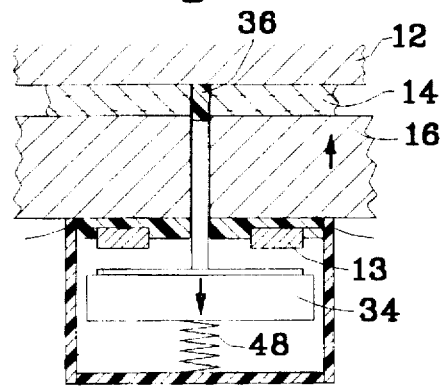
FIG. 4 is a view similar to FIGS. 2–3 showing the worn brake pad in contact with the brake drum.

FIGS. 2–4 illustrate in enlarged form the components of the brake pad wear detection and warning system 10. The primary component of system 10 is a detector 11. As shown therein a housing 26 is provided for the working components of the detector 11. Housing 26 is preferably completely closed except for an axial opening in its wall 29 disposed against brake shoe 16. It is to be understood, however, that the housing may take other forms including being of skeletal shape or of essentially closed walls having slots or other openings. A closed housing is preferred to essentially seal the components of detector 11. Although housing 26 is shown to have a circular cross section, other shapes such as square or elliptical can be used. Housing 26 should include some structure such as a back wall 28 remote from the open end of the housing. The detector 11 is mounted to the inner surface 30 of shoe 16 in any suitable manner. If desired housing 26 may include flanges or other structure to facilitate the mounting of housing 26 to brake shoe 16. The drawings illustrate detector 11 disposed against brake shoe 16, which is the preferred practice of the invention. If desired, however, detector 11 may be spaced from brake shoe 16 but still mounted to the brake shoe.

As illustrated, a plunger 32 is mounted in housing 26. Plunger 32 includes an enlarged head 34 with an outwardly extending elongated stem 36. Brake shoe 16 includes a passageway 38 extending completely through brake shoe 16 in alignment with a hole 40 extending partially into brake pad 14. Brake pad 14 has an outer wear surface 42 disposed toward rotatable brake drum 12. During continued use of the brake system the brake pad thickness decreases and the wear surface 42 thus gradually moves closer toward the outer surface 44 of brake shoe 16.

The invention is intended to provide a signal when there has been a predetermined amount of wear of the brake shoe. FIG. 2, for example, illustrates by the letter A a predetermined thickness of wear that would be permitted before the system 10 is actuated to give the indication of reaching the amount of brake pad thickness corresponding to the end 46 of hole 40 and the outer surface 44 of brake shoe 16. FIG. 3, for example, illustrates the wear surface 42 at its location when the thickness A has been completely worn.

A biasing structure is provided within housing 26 to urge the stem 36 in a direction toward the wear surface 42 of brake pad 14. Any suitable biasing structure may be used, preferably a resilient member such as spring 48 is provided which is mounted against back wall 28 and disposed against the outer wall 33 of the plunger head 34 to urge plunger head 34 in a direction toward brake shoe 16. If desired a recess 50 may be formed in wall 33 to act as a seat for spring 48. To minimize manufacturing costs, however, it is preferable to omit the recess and instead to simply dispose the spring 48 directly against the flat wall 33. The longitudinal movement of the plunger 32 is resisted by stem 36 being in contact with the amount of thickness of brake pad 14 extending beyond the closed end 46 of hole 40.

As long as some thickness A remains for brake pad 14 the components of detector 11 are in the condition shown in FIG. 2. In that condition the circuitry 20 is not completed and thus no warning is given by indicator 18. As the wear pad 14, however, continues to wear the wear surface 42 moves closer toward outer surface 44 of shoe 16. When the remaining thickness of wear pad 14 has reached the distance of end 46 of hole 40, the wear pad 14 no longer prevents any longitudinal movement of stem 36. Spring 48 thus urges the plunger 32 in a direction away from back wall 28 with the tip of stem 36 extending beyond the wear surface 42 as shown in FIG. 3.

Enlarged head 34 is provided on its inner surface with first electrical contact members 52 which may, for example, be a copper band or flat copper ring mounted to the otherwise non-conductive plunger. Second stationary electrical contact members 54 such as copper strips or a flat copper ring are mounted to the inner surface 13 of wall 29 in the path of movement of movable electrical contacts 52. In the condition shown in FIG. 2 the electrical contacts 52 and 54 are spaced from each other. When there has been a predetermined wear of pad 14 in the condition shown in FIG. 3, the plunger is moved longitudinally away from wall 28. Electrical contact is thereby made between conductive members 52 and 54 to complete the circuit 20. Completion of the circuit 20 causes indicator 18 to give its alarm by giving a light signal such as from an LED and/or by an audio signal such as a buzzer to indicate that the brake pad has been worn by the thickness A.

An advantage of the system 10 is that even after the brake pad 14 has been worn to the predetermined thickness the braking system can still function. Because the plunger stem 36 is resiliently biased it is still possible to provide contact between the remaining portion of brake pad 14 and the brake drum 12 by moving the brake shoe 16 in the direction shown in the arrow of FIG. 4. When the wear surface 42 contacts drum 12 stem 36 is simply retracted against the force of spring 48 to compress the spring as also shown in FIG. 4.

Because hole 40 is of relatively small diameter, there is minimal reduction in the effective area of surface 42. Thus the braking system continues to function effectively even when the warning system is actuated.

Once the warning has been given by indicator 18 the user realizes that it is necessary to reline the brake shoe by providing a relining brake pad 14 which would also incorporate a hole 40 having a length corresponding to the thickness of the brake pad intended to remain when the wear surface has reached the predetermined location for giving a new warning.

Any suitable materials may be used in the practice of this invention. Brake shoe 16 and wear pad 14 would be alterations of existing conventional materials. Housing 26 is preferably made from a plastic nonconductive material with the plunger 32 also made of a nonconductive preferably plastic material. FIG. 4, for example, illustrates the stem 36 to be partially in section and FIG. 3 illustrates the head 34 to be partially in section to show the plastic material. The electrical contacts 52,54 are preferably made of copper or other suitable conductive material. Spring 48 could be a rubber strip or other suitable resilient material.

The following would be the sequence of steps in mounting and using the system of this invention.

1. Drill a hole 38 in the brake shoe 16 slightly larger than diameter of plunger stem 36.
2. Drill hole 40 the on back side of brake pad 14 to a depth that leaves the desired brake pad wear intact.
3. Attach (such as by bolts) detector housing 26 to the brake shoe 16 on the opposite side of the brake pad 14. Plunger stem 16 is centered on hole 38 in brake shoe 16 and hole 40 brake pad 14.
4. At initial installation the copper band 52 on the plunger head 34 is separated from the copper strips 54 on the brake shoe 16 by the plunger stem 36 bottoming out on the brake pad 14. Electrical circuit 20 is broken.
5. When brake pad 14 is worn to desired depth, the spring 48 will push the plunger stem 36 through the brake pad 14 and thus form an electrical circuit 20 which will illuminate the warning light 18.
6. Should the brake be set subsequently, the plunger 32 will retract, allowing for normal pad wear until the brake is released.

It is to be understood that the reference to various materials, such as copper bands, rubber strips, plastic housings, etc. is intended merely for exemplary purposes and that other suitable equivalent materials may be used within the spirit of this invention. Thus, for example, it is not necessary to use the form of spring illustrated in FIG. 2 as the biasing means. Any other biasing means could be used which would tend to urge the plunger in a direction toward the brake pad.

It is to be understood that the components illustrated herein are also exemplary of the invention. In its broad practice the invention involves providing a biased plunger stem within a hole in the wear pad with the hole being closed by the thickness of the wear pad corresponding to a predetermined amount of wear. When that predetermined amount of wear has taken place the plunger stem is allowed to move longitudinally so as to cause an electrical circuit to be completed for giving an alarm.

The present invention has a number of distinct advantages. For example, there is a continuous indication of worn brakes without interference with normal braking operations. This is accomplished because the plunger retracts as shown in FIG. 4 to allow for normal brake operations when the brake is set after the warning system 10 has been activated. Limiting the length of the plunger stem assures that there is never contact between the stem and the rotating portion of the brake when the brake is not set.

The system 10 eliminates metal to metal contact between the rotating drum and the brake pad wear detector 11 that could cause damage to the rotating drum. The contact point, i.e. the stem, is preferably plastic and, since it is free to retract, the normal damage causing force to the brake surface is virtually non-existent.

With the present invention there is no chance of false indications due to self-contained or protected electrical switch. The invention does not rely on an electrical circuit being closed by contact with the rotating brake drum. This is important since there is no chance of contamination and/or deterioration of contacts by dirt, humidity or other factors. Additionally, there is no need to insulate the conductive elements to prevent false warnings.

The manufacturing of existing brake or brake pads does not have to be changed to incorporate the present invention. A hole in the normal brake pad could be added after manufacturing. No electrical conductive elements in the brake pads or other expensive or cumbersome adaptations to the brake pads are necessary.

The present invention provides for easy retrofit of existing brakes. The only modification necessary is to form a hole or passageway in the brake shoe for the detector stem 36 and the hole in the brake pad which would be aligned with the brake shoe passageway. The system also provides a quick check to the mechanic replacing worn brake pads to ensure that new pads are installed correctly.

The system 10 is easily adapted to cover as much brake surface area as required. Since the detector unit 11 is relatively very small a number of detectors 11 can be installed on any one brake pad or series of brake pads. These detectors can then be wired in series or parallel depending on the desired warning indication.

The invention is inexpensive. The components would be made from materials that are readily available, inexpensive and easily formed to meet the requirements of different brake assemblies and thus could be very easily mass produced and assembled.

The mounting of the detector 11 could be accomplished in any suitable manner, such as by glue or other adhesive or by threaded fasteners.

The system 10 is both reliable and maintenance free. The detector housing 26 provides an enclosed environment and there are no moving parts until the brake pad has been worn the desired amount, there is virtually no chance of mechanical brake down of the detector system.

Although the invention has been described with respect to its preferred use with a brake pad, the invention may have other uses. For example, the concepts of the invention may be used to detect the removal of any surface such as by erosion, wear or simply physically moving the surface. When the abutting surface is removed, the plunger 36 no longer is restrained and the system activates.

What is claimed is:

1. A brake pad wear detection and warning system featuring a self contained electrical circuit that is electrically isolated from the brake and associated brake shoe and rotating drum, the system further comprising a power source, an electrical warning unit and electrical wires to complete the electrical circuit; a brake pad with a countersink which leaves a portion of the brake pad to be worn intact; an electrical switch that is normally in the open position is attached to the brake shoe on the side opposite the brake pad and consists of a non electrically conductive housing with an internal resiliently biased plunger mechanism whose non electrically conductive stem protrudes through said housing and extends through a passageway in the brake shoe that is aligned with the countersink in the brake pad and whose movement is restricted by the portion of the brake pad designated for wear; two electrical contacts separated to form an open electrical circuit are imbedded in the housing wall nearest to the brake shoe and in the direction that will isolate the electrical circuit from the brake shoe and contact with an electrical bridge that is mounted on the resiliently biased plunger which features an enlarged head to accommodate the electrical bridge wherein the designated portion of the brake pad has worn, the plunger and the electrical bridge is free to travel towards the electrical contacts mounted on the housing thus completing the electrical circuit and activating the warning unit.

2. Said detection and warning system of claim 1 also is used in applications other than brake systems.

3. Said electrical switch of claim 1 is in the closed position when the resiliently mounted plunger is free to travel, the switch is held in the open position when a resisting force prevents the electrical bridge mounted on the plunger from connecting the contacts embedded in the switch housing and the housing and plunger stem are made of non electrically conductive material so that the contacts and electrical bridge are electrically isolated from elements outside the housing.

* * * * *